US012603462B2

(12) United States Patent
Little

(10) Patent No.: US 12,603,462 B2
(45) Date of Patent: Apr. 14, 2026

(54) ELECTRICAL CONNECTOR HAVING A SHIELD PLATE EMBEDED WITHIN A CONDUCTIVE PLASTIC BRIDGE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 292 days.

(21) Appl. No.: 18/220,427

(22) Filed: Jul. 11, 2023

(65) Prior Publication Data

US 2024/0030658 A1 Jan. 25, 2024

Related U.S. Application Data

(60) Provisional application No. 63/368,972, filed on Jul. 20, 2022.

(51) Int. Cl.

| | |
|---|---|
| ***H01R 13/6585*** | (2011.01) |
| ***H01R 13/405*** | (2006.01) |
| ***H01R 43/24*** | (2006.01) |

(52) U.S. Cl.

CPC ....... *H01R 13/6585* (2013.01); *H01R 13/405* (2013.01); *H01R 43/24* (2013.01)

(58) Field of Classification Search

CPC . H01R 12/00; H01R 13/6587; H01R 13/6594
USPC ......... 439/607.33, 79, 607.08, 607.09, 607.4
See application file for complete search history.

(56) References Cited

U.S. PATENT DOCUMENTS

| | | | | |
|---|---|---|---|---|
| 6,709,294 | B1 | 3/2004 | Cohen et al. | |
| 7,771,233 | B2 | 8/2010 | Gailus | |
| 8,371,875 | B2 | 2/2013 | Gailus | |
| 8,636,543 | B2 | 1/2014 | Mcnamara | |
| 9,004,942 | B2 | 4/2015 | Paniaqua | |
| 9,660,384 | B2 | 5/2017 | Paniagua | |
| 10,135,197 | B2 | 11/2018 | Little et al. | |
| 10,170,867 | B2 * | 1/2019 | Ju | H01R 13/6581 |
| 10,276,985 | B1 | 4/2019 | Liu et al. | |
| 10,367,313 | B2 * | 7/2019 | Wu | H01R 13/6585 |

(Continued)

FOREIGN PATENT DOCUMENTS

| | | |
|---|---|---|
| CN | 215732518 U | 2/2022 |
| CN | 114597713 A | 6/2022 |
| TW | M606399 U | 1/2021 |

*Primary Examiner* — Phuong K Dinh
(74) *Attorney, Agent, or Firm* — Ming Chieh Chang

(57) ABSTRACT

An electrical connector includes: an insulative housing having a tongue and a cavity; two rows of terminals secured to the insulative housing and exposing respectively to two opposite surfaces of the tongue, each row of terminals having plural signal terminals and plural ground terminals, the plural ground terminals being exposed to the cavity; a conductive plastic bridge disposed in the cavity to provide electrical bridging between the plural ground terminals; and a shield plate molded with the conductive plastic bridge and located between the two rows of terminals.

18 Claims, 8 Drawing Sheets

(56) References Cited

U.S. PATENT DOCUMENTS

| | | | |
|---|---|---|---|
| 10,411,411 | B2 | 9/2019 | Tang et al. |
| 10,511,128 | B2 | 12/2019 | Kirk et al. |
| 10,644,455 | B1 | 5/2020 | Champion |
| 10,777,921 | B2 | 9/2020 | Lu et al. |
| 2014/0127946 | A1 | 5/2014 | Ito et al. |
| 2020/0266584 | A1 | 8/2020 | Lu |

* cited by examiner

ELECTRICAL CONNECTOR HAVING A SHIELD PLATE EMBEDED WITHIN A CONDUCTIVE PLASTIC BRIDGE

CROSS REFERENCE TO RELATED APPLICATIONS

This application claims priority to and the benefit of U.S. Provisional Patent Application No. 63/368,972, filed on Jul. 20, 2022, the contents of which are incorporated entirely herein by reference.

BACKGROUND OF THE INVENTION

1. Field of the Invention

The present invention relates to an electrical connector injection molded with conductive plastic.

2. Description of Related Arts

U.S. Pat. No. 9,660,384 discloses an electrical connector comprising hybrid shields with lossy portions and conductive portions to allow the hybrid shields to be relatively thin such that they can be incorporated into the mating interface regions or other mechanically constrained regions of the connector to provide adequate crosstalk suppression without undesirably impacting impedance. The conductive portions may be shaped to preferentially position the conductive regions adjacent signal conductors susceptible to cross talk. In some embodiments, the conductive portions may be formed of a metal foil, or may be formed of conductive ink that is painted onto the lossy portions.

An improved electrical connector is desired.

SUMMARY OF THE INVENTION

An object of the present invention is to provide an electrical connector with a conductive plastic embedded with a shielding plate.

To achieve the above-mentioned object, an electrical connector comprises: an insulative housing having a tongue and a cavity; two rows of terminals secured to the insulative housing and exposing respectively to two opposite surfaces of the tongue, each row of terminals including a plurality of signal terminals and a plurality of ground terminals, the plurality of ground terminals being exposed to the cavity; a conductive plastic bridge disposed in the cavity to provide electrical bridging between the plurality of ground terminals; and a shield plate molded with the conductive plastic bridge and located between the two rows of terminals.

Other advantages and novel features of the invention will become more apparent from the following detailed description of the present embodiment when taken in conjunction with the accompanying drawings.

Figure 1:
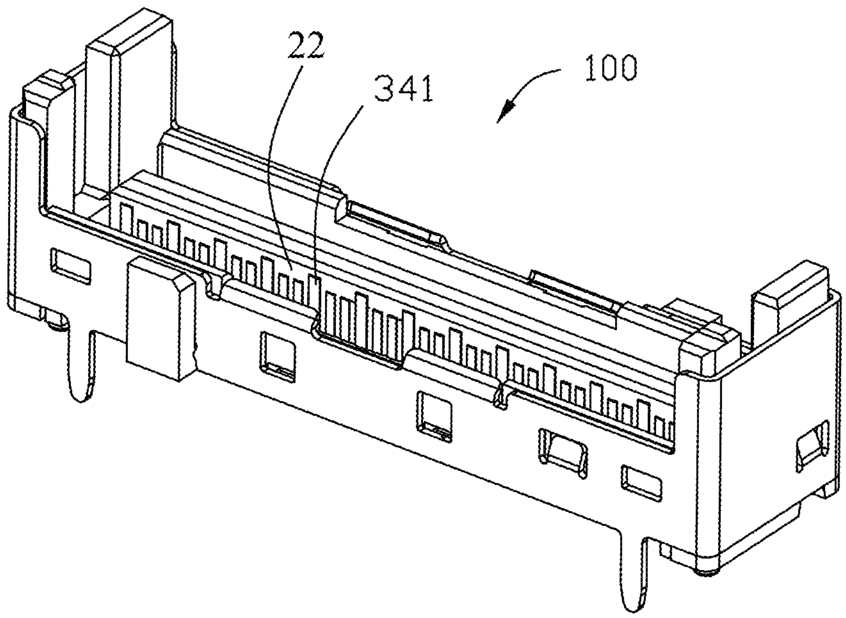
FIG. 1 is a perspective view of an electrical connector in accordance with the present invention.
Figure 2:
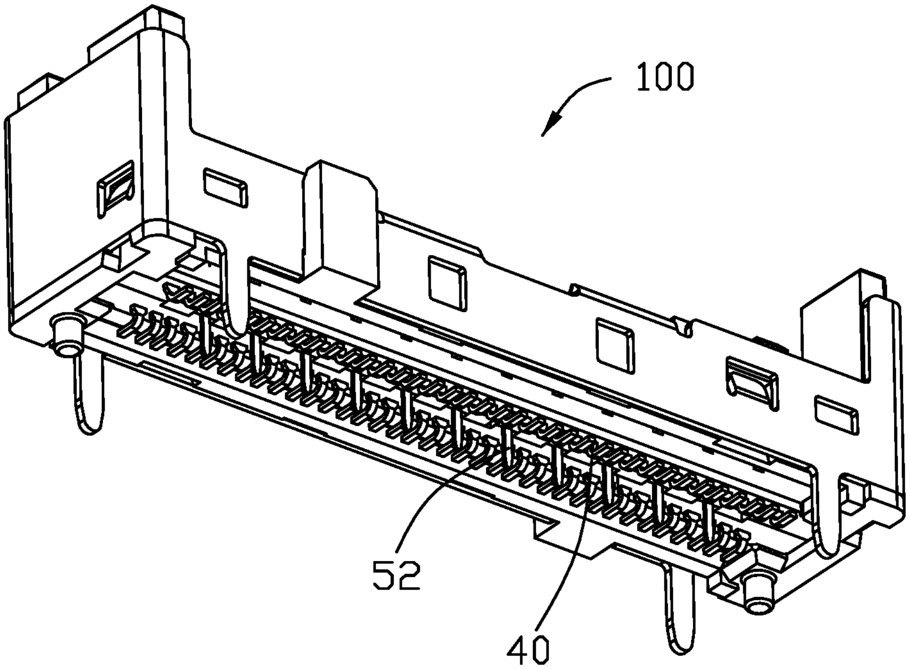
FIG. 2 is another perspective view of the electrical connector.
Figure 3:
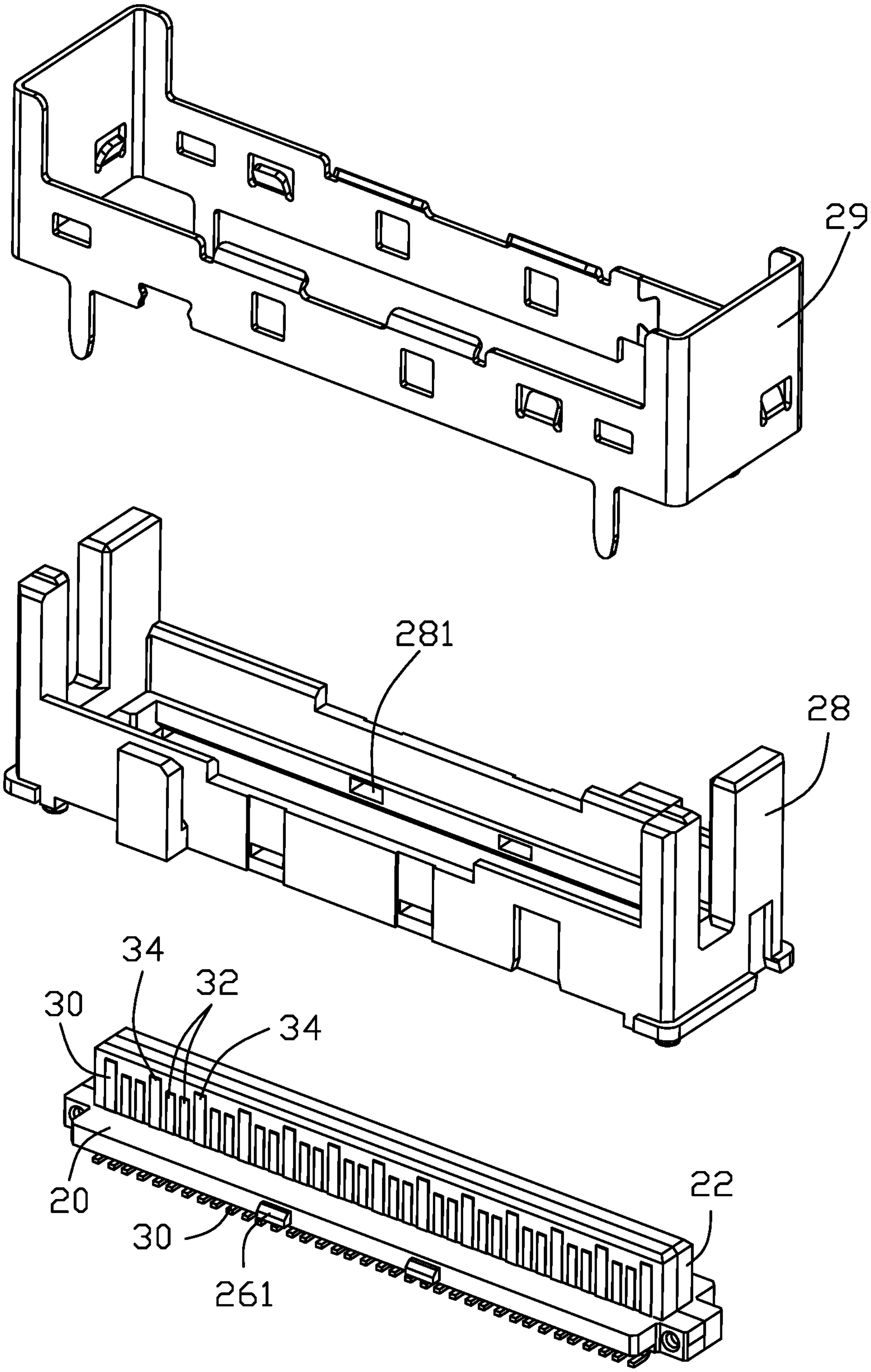
FIG. 3 is an exploded view of the electrical connector.
Figure 4:
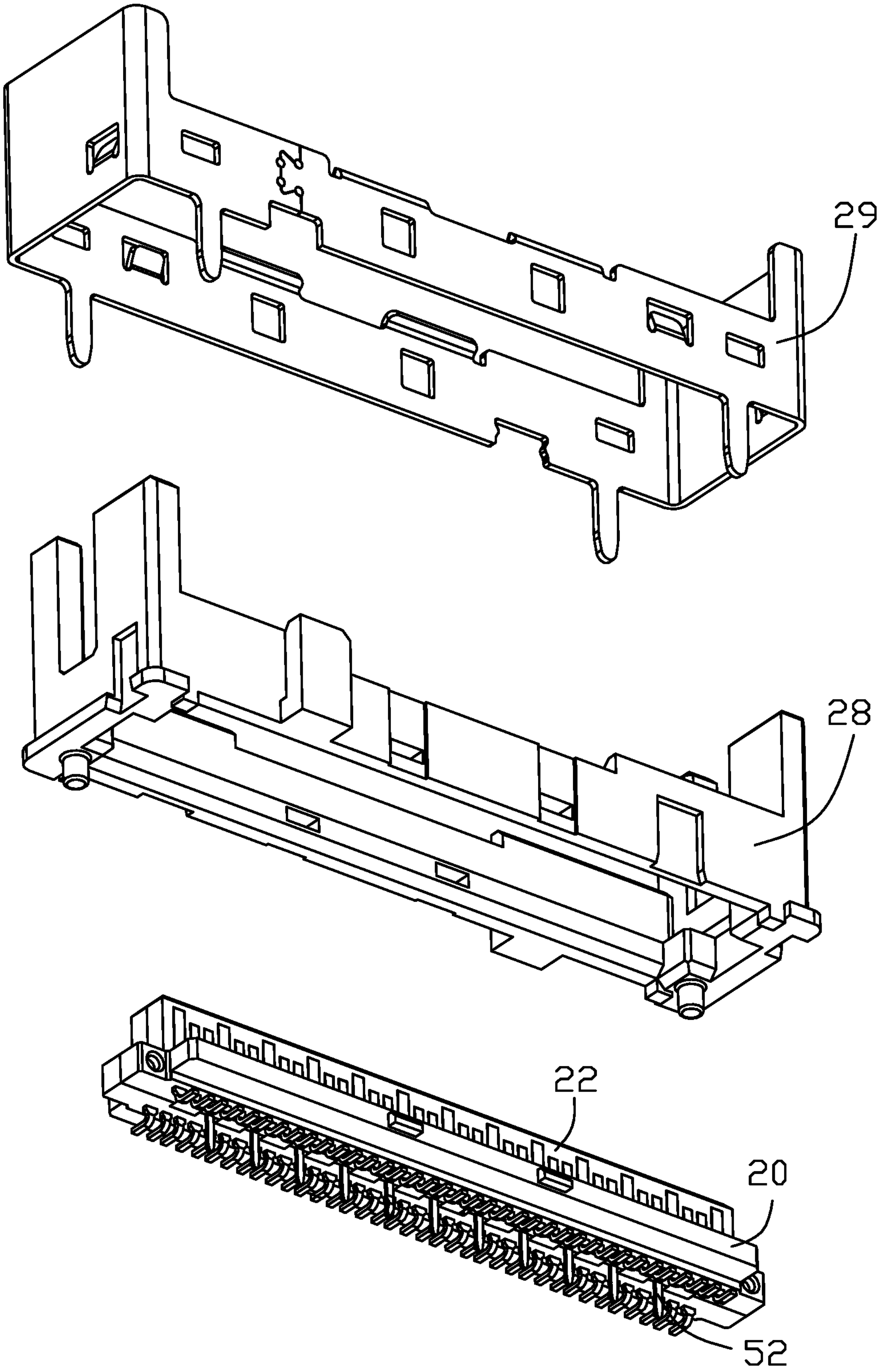
FIG. 4 is another exploded view of the electrical connector.
Figure 5:
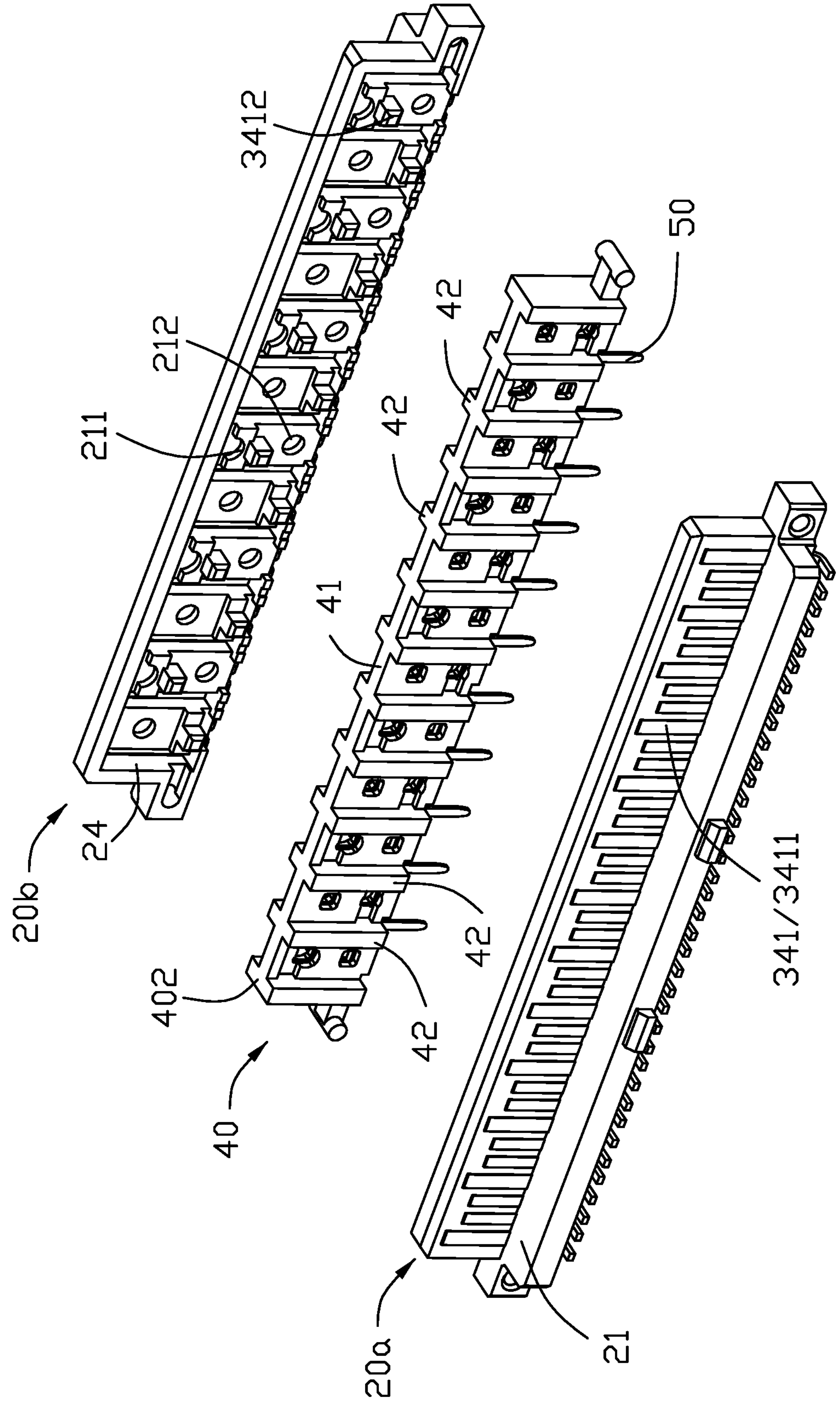
FIG. 5 is a further exploded view of the electrical connector omitting a shroud and a shell thereof.
Figure 6:
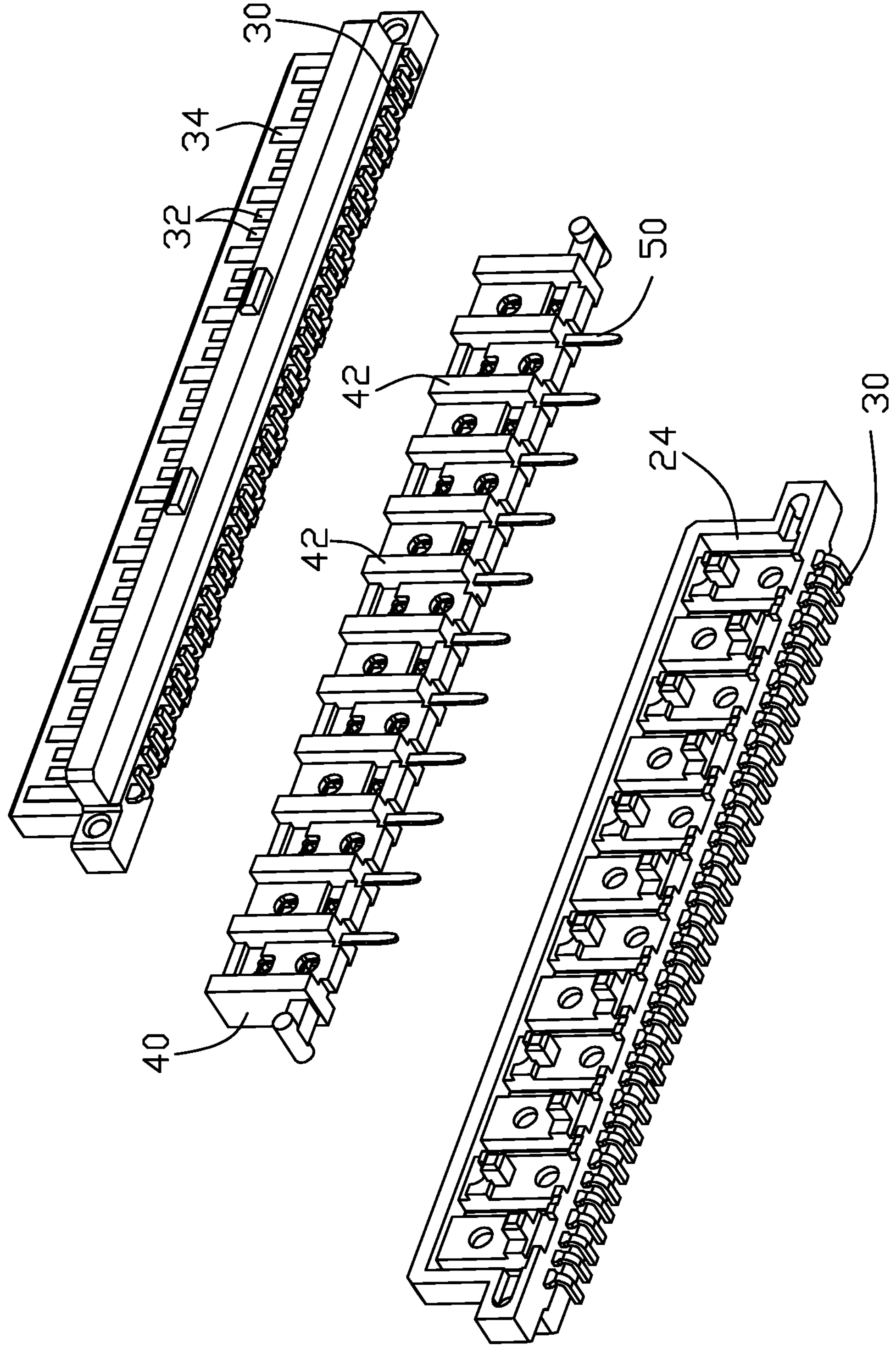
FIG. 6 is a view similar to FIG. 5 but from another perspective.

Other advantages and novel features of the invention will become more apparent from the following detailed description of the present embodiment when taken in conjunction with the accompanying drawings.

DETAILED DESCRIPTION OF THE PREFERRED EMBODIMENT

Referring to FIGS. 1-8, an electrical connector 100 features a tongue in receptacle design where non-cantilever beam tongue is adopted in order to reduce overall mating height. The electrical connector 100 includes an insulative housing 20 having a tongue 22 and a cavity 24, two rows of terminals 30 secured to the insulative housing 20 and exposing respectively to two opposite surfaces of the tongue 22, a conductive plastic bridge 40 disposed in the cavity 24, and a shield plate 50 molded with the conductive plastic bridge 40. Each row of terminals 30 includes a plurality of signal terminals 32 and a plurality of ground terminals 34, the plurality of ground terminals 34 are exposed to the cavity 24. The conductive plastic bridge 40 is disposed in the cavity 24 to be electrically coupled to the plurality of ground terminals 34. The shield plate 50 may have a plurality of soldering legs or tails 52 to contact printed circuit board ground via for FEXT improvement.

The electrical connector 100 may further include a shroud 28 enclosing the insulative housing 20 and a receptacle shell 29 enclosing the shroud 28. The shroud 28 may have features for retaining the insulative housing 20. The shell 29 may have retention features such as tabs and barbs for retaining to the shroud 28. The signal terminals 32 are preferably arranged in pairs for differential signals transmission.

The conductive plastic bridge 40 has two rows of branches 42 aligned with corresponding ground terminals 34 so as to provide electrical bridging therebetween, the branches 42 are of a longitudinal rib extending in an upright direction. The terminals are of a blanking terminal, that are stationary terminals, each terminal includes a contacting portion exposed upon the surface of the tongue 22, a leg portion and a middle portion connecting with the contacting portion and the leg portions. Each ground terminal 34 has a contacting portion 341 with a contacting face 3411 exposed upon the face of the tongue 22 and a back face 3412 exposed upon the cavity 24. The grounding terminals have longer and wider contacting portions than the signal terminals 22. The conductive plastic bridge 40 has an upper surface 402 substantially leveled with an upper end of the contacting portion 341 for improved signal integrity. The electrical connector 100 has a first terminal module **20*a* and a second terminal module 20*b* each structured as an insert molded lead frame assembly, namely, each module having a respective row of terminals 30 and a corresponding insulator 21. The first terminal module 20*a* and the second terminal module 20*b* are combined together, e.g., by way of locating posts 211 and holes 212. The tongue 22 is made with upper portions of the two insulator 21, the cavity 24 is formed between the back faces of the insulator 21 and opening downwards through a bottom of the insulator 21** so that the conductive plastic can inject from the bottom.

Figure 8:
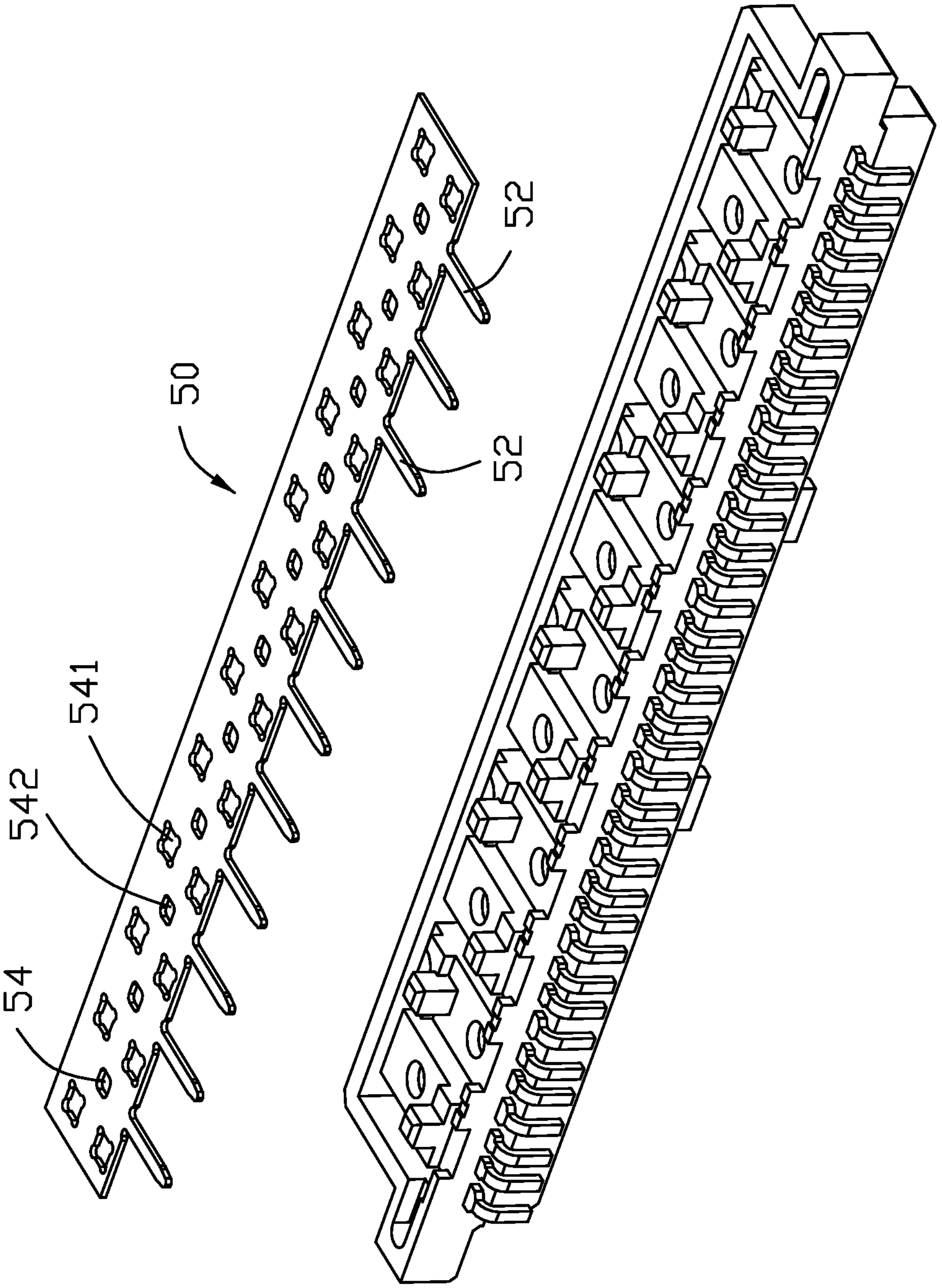
FIG. 8 is an exploded view of the shield plate and a terminal module of the electrical connector.

Referring to FIG. 8 in particular, after the first terminal module and the second terminal module are formed, the shield plate 50 may be assembled to one of the first and second terminal modules and then the other terminal module may be pressed thereon. Thereafter, the conductive plastic bridge 40 is molded with the shield plate 50 in the cavity 24 to provide electrical bridging between the ground terminals 34.

Figure 7:
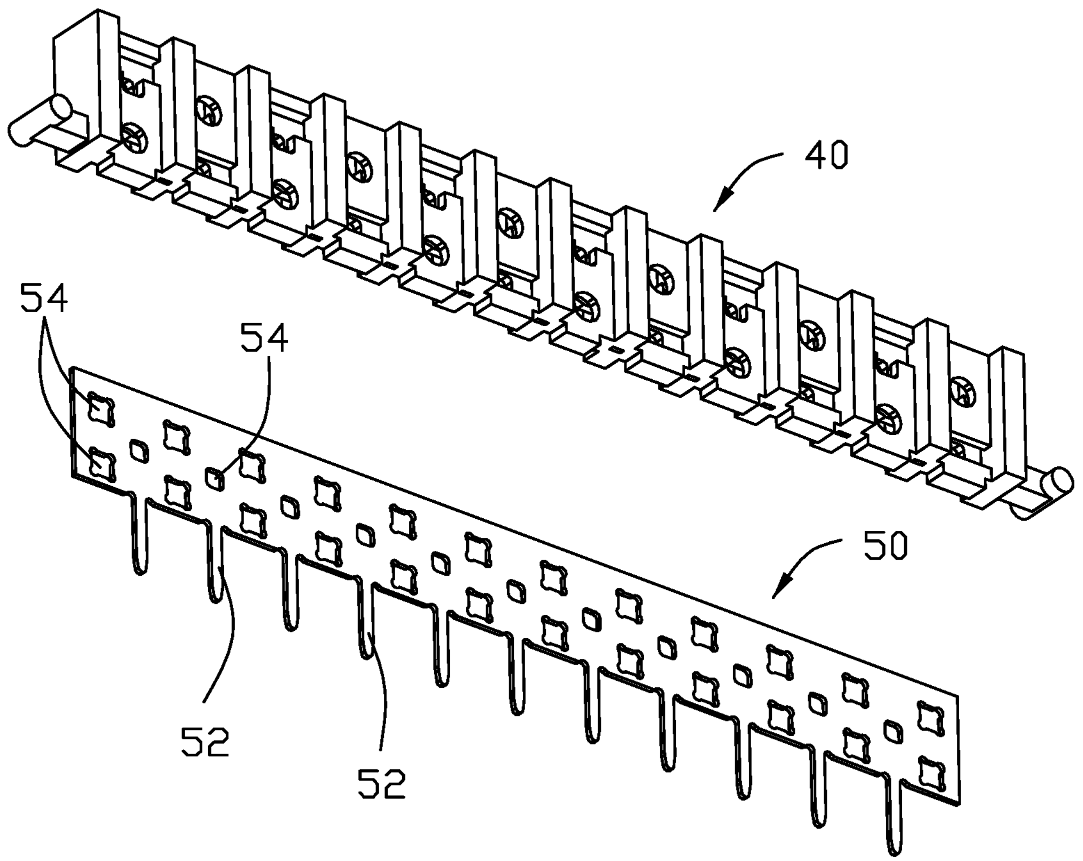
FIG. 7 is an exploded view of a shield plate and a conductive plastic bridge of the electrical connector.

Referring to FIG. 7 in particular, the electrical connector 100 may also be made by molding the conductive plastic bridge 40 with the shield plate 50 first. Then, the two rows of terminals 30 are molded with an insulator around the conductive plastic bridge 40 to have the ground terminals 34 be electrically bridged by the conductive plastic bridge 40. Punching holes 54 may be provided in the shield plate 50 for better plastic flow during molding process. The punching holes 541 comprises two rows of first punching holes 54 and one row of second punching holes 542 disposed between the two rows of the first punching holes 541, the first punching holes 541 are larger than the second punching hole 542 in size. The first punching holes 541 arranged in a mating direction of the connector are aligned with each other while offset from the second punching holes 542.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:
- an insulative housing having a tongue and a cavity;
- two rows of terminals secured to the insulative housing and exposing respectively to two opposite surfaces of the tongue, each row of terminals comprising a plurality of signal terminals and a plurality of ground terminals, the plurality of ground terminals being exposed to the cavity;
- a conductive plastic bridge disposed in the cavity to provide electrical bridging between the plurality of ground terminals; and
- a shield plate molded with the conductive plastic bridge and located between the two rows of terminals.

2. The electrical connector as claimed in claim 1, wherein the shield plate has a plurality of soldering legs extending out of the conductive plastic bridge.

3. The electrical connector as claimed in claim 1, wherein the shield plate defines plural punching holes thereon.

4. The electrical connector as claimed in claim 3, wherein the plural punching holes comprises two rows of first punching holes and one row of second punching holes disposed between the two rows of the first punching holes, and the first punching holes are larger than the second punching hole in size.

5. The electrical connector as claimed in claim 4, wherein the first punching holes are arranged in a mating direction of the connector and aligned with each other while offset from the second punching holes.

6. The electrical connector as claimed in claim 1, wherein respective top ends of the conductive plastic bridge and the grounding terminals are flush with each other.

7. A method of making an electrical connector, comprising the steps of:
- molding a row of first terminals with a first insulator to form a first terminal module and a row of second terminals with a second insulator to form a second terminal module;
- disposing a shield plate in a cavity between the first terminal module and the second terminal module; and
- molding a conductive plastic bridge with the shield plate in the cavity to provide electrical bridging between selected terminals of the row of first and second terminals.

8. The method of making the electrical connector as claimed in claim 7, wherein the first terminal module and the second terminal module are assembled together to define the cavity and then the shielding plate is inserted into the cavity.

9. The method of making the electrical connector as claimed in claim 7, wherein the shielding plate is assembled to the first terminal module and then the second terminal module is assembled to the first terminal module to define the cavity.

10. The method of making the electrical connector as claimed in claim 7, wherein the shield plate defines plural punching holes thereon.

11. The method of making the electrical connector as claimed in claim 10, wherein the plural punching holes comprises two rows of first punching holes and one row of second punching holes disposed between the two rows of the first punching holes, and the first punching holes are larger than the second punching hole in size.

12. The method of making the electrical connector as claimed in claim 11, wherein the first punching holes are arranged in a mating direction of the connector and aligned with each other while offset from the second punching holes.

13. The method of making the electrical connector as claimed in claim 7, wherein the shield plate has a plurality of soldering legs extending out of the conductive plastic bridge.

14. A method of making an electrical connector, comprising the steps of:
- molding a conductive plastic bridge with a shield plate; and
- molding a plurality of terminals with an insulator around the conductive plastic bridge to have selected ground terminals of the plurality of terminals be electrically bridged by the conductive plastic bridge.

15. The method of making the electrical connector as claimed in claim 14, wherein the shield plate defines plural punching holes thereon.

16. The method of making the electrical connector as claimed in claim 15, wherein the plural punching holes comprises two rows of first punching holes and one row of second punching holes disposed between the two rows of the first punching holes, and the first punching holes are larger than the second punching hole in size.

17. The method of making the electrical connector as claimed in claim 16, wherein the first punching holes are arranged in a mating direction of the connector and aligned with each other while offset from the second punching holes.

18. The method of making the electrical connector as claimed in claim 14, wherein the shield plate has a plurality of soldering legs extending out of the conductive plastic bridge.

* * * * *